US012097708B2

(12) United States Patent
Inui et al.

(10) Patent No.: US 12,097,708 B2
(45) Date of Patent: Sep. 24, 2024

(54) INKJET RECORDING APPARATUS

(71) Applicant: KYOCERA Document Solutions Inc., Osaka (JP)

(72) Inventors: Yasutaka Inui, Osaka (JP); Naoto Miyakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 119 days.

(21) Appl. No.: 17/937,321

(22) Filed: Sep. 30, 2022

(65) Prior Publication Data

US 2023/0106417 A1 Apr. 6, 2023

(30) Foreign Application Priority Data

Oct. 1, 2021 (JP) ................................ 2021-162628

(51) Int. Cl.
*B41J 2/165* (2006.01)

(52) U.S. Cl.
CPC ....... *B41J 2/16538* (2013.01); *B41J 2/16544* (2013.01); *B41J 2002/1655* (2013.01)

(58) Field of Classification Search
CPC B41J 2/16538; B41J 2/16544; B41J 2/16585; B41J 2/16552; B41J 2002/16591; B41J 2002/16558; B41J 2002/16502; B41J 2/16535; B41J 2002/1655
See application file for complete search history.

(56) References Cited

U.S. PATENT DOCUMENTS

2018/0264824 A1 * 9/2018 Araki .................. B41J 2/16508

FOREIGN PATENT DOCUMENTS

JP 2001-310476 A 11/2001

* cited by examiner

*Primary Examiner* — Jannelle M Lebron
(74) *Attorney, Agent, or Firm* — Studebaker & Brackett PC

(57) ABSTRACT

An image forming apparatus includes a recording head and a wiper. The recording head is provided with a nozzle region where a plurality of ink ejection ports are opened downward. The wiper comes into contact with the nozzle region and moves in a predetermined direction to wipe the ink ejection ports. A head mounting part protruding outward is provided along the wiping direction on a side surface of the recording head at a position higher than the nozzle region. The head mounting part has: an outside portion having a water repellency higher than that of the side surface; and an inside portion provided inside the outside portion and having a water repellency smaller than that of the outside portion.

7 Claims, 5 Drawing Sheets

INKJET RECORDING APPARATUS

INCORPORATION BY REFERENCE

This application is based on and claims the benefit of priority from Japanese patent application No. 2021-162628 filed on Oct. 1, 2021, which is incorporated by reference in its entirety.

BACKGROUND

The present disclosure relates to an inkjet type image forming apparatus including a wiper which wipes an ink off an ink ejection port of a recording head.

The inkjet type image forming apparatus is provided with a wiper which wipes an ink off an ink ejection port of a nozzle of a recording head. The wiper moves in one direction from a wiping start position to a wiping end position while coming into contact with a nozzle region where the ejection port opens, and wipes the ink ejection port.

In such a wiping operation, the wiped ink may protrude from the wiper, spread around the side surface of the recording head, gradually rise upward along the side surface and adhere on the side surface. When the wiping operation is repeated, an amount of the deposited ink is increased. Then, the ink adhering on the side surface falls onto the sheet, and causes image defect and contaminating the inside of the apparatus.

Therefore, there is an inkjet type image forming apparatus having a head cover covering the side surface of the recording head. A water repellent treatment is applied to the surface of the head cover. Thereby, even if the ink spreads around the side surface of the recording head, the ink is repelled by the head cover, so that adhering the ink to the side surface of the recording head can be reduced.

However, in the inkjet recording apparatus described above, a narrow gap is formed between the head cover and the recording head, and the wiped ink may enter the gap. When the amount of the ink that enters the gap becomes large, the ink may fall and cause the above-described image defect or the contaminating the inside of the apparatus.

SUMMARY

In accordance with an aspect of the present disclosure, an image forming apparatus includes a recording head and a wiper. The recording head is provided with a nozzle region where a plurality of ink ejection ports are opened downward. The wiper comes into contact with the nozzle region and moves in a predetermined direction to wipe the ink ejection ports. A head mounting part protruding outward is provided along the wiping direction on a side surface of the recording head at a position higher than the nozzle region. The head mounting part has: an outside portion having a water repellency higher than that of the side surface; and an inside portion provided inside the outside portion and having a water repellency smaller than that of the outside portion.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus according to one embodiment in the present disclosure will be described.

Figure 1:
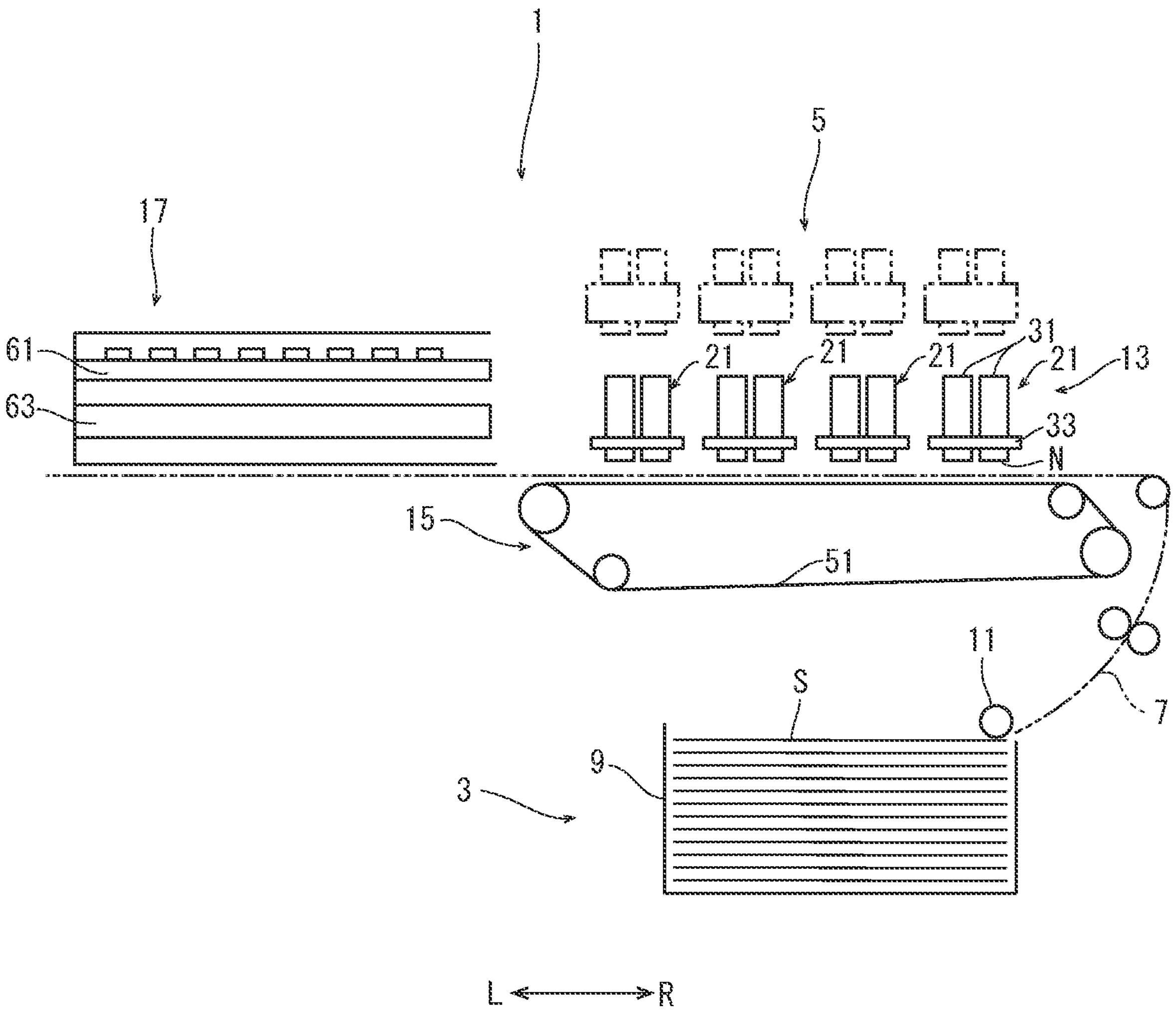
FIG. 1 is a front view schematically showing an inner structure of an image forming apparatus according to one embodiment of the present disclosure.

With reference to FIG. 1, the image forming apparatus 1 will be described. FIG. 1 is a front view schematically showing an inner structure of the image forming apparatus 1 (at the time of image forming operation). Reference numerals Fr, Rr, L and R in each of the drawings indicate the front, the rear, the left and the right of the image forming apparatus 1.

The image forming apparatus 1 includes a sheet feeding part 3, an inkjet type image forming part 5 and a conveyance path 7 along which a sheet S fed by the sheet feeding part 3 is conveyed through the image forming part 5 to a discharge port (not shown). The sheet feeding part 3 includes a sheet feeding cassette 9 in which the sheet S is stored, and a sheet feeding device 11 which feeds the sheet S from the sheet feeding cassette 9 to the conveyance path 7. The image forming part 5 includes a head unit 13, a conveying unit 15 and a maintenance unit 17.

First, the head unit 13 will be described. The head unit 13 includes four line heads 21 corresponding to ink of four colors (yellow, magenta, cyan and black). The four line heads 21 are arranged in parallel along a conveying direction (the left direction) of the sheet S along the conveyance path 7.

Figure 2:
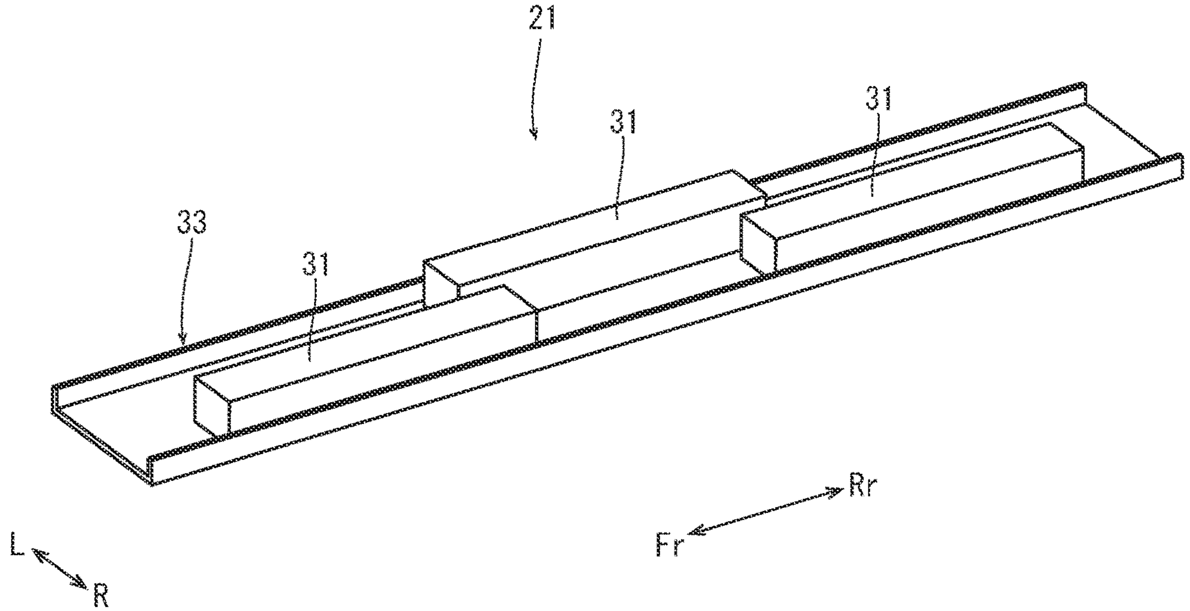
FIG. 2 is a perspective view showing a line head in the image forming apparatus according to the embodiment of the present disclosure.

Next, each of the line heads 21 will be described with reference to FIG. 2. FIG. 2 is a perspective view showing the line head 21.

Each line head 21 has three recording heads 31 and a head base 33 by which the three recording heads 31 are supported.

Each recording head 31 is formed in a rectangular parallelepiped shape long in the front-and-rear direction, and has a large number of nozzles arranged in the front-and-rear direction and the left-and-right direction. An ejection port of each nozzle is opened to the lower surface of the recording head 31. Each nozzle ejects the ink downward from the ejection port by an ink ejection method such as a piezoelectric type or a thermal type. A region where the ejection ports are opened on the lower surface of the recording head 31 is defined as a nozzle region N.

The head base 33 is a flat plate member long in the front-and-rear direction. The three recording heads 31 are supported by the head base 33 in a zigzag arrangement pattern along the front-and-rear direction. Each recording head 31 is supported so that the nozzle region N projects downward from the lower surface of the head base 33. The recording head 31 is made of metal such as SUS, for example. The structure of the recording head 31 will be described later.

Referring again to FIG. 1, the head unit 13 is supported so as to be movable upward and downward between a printing position where the head unit 13 performs an image forming operation (see the solid line in FIG. 1) and a retracting position where the head unit 13 is retracted upward from the printing position and is to be maintained and protected (see the two-dot chain line in FIG. 1).

Next, the conveying unit 15 will be described with reference to FIG. 1. The conveying unit 15 is provided with a conveying belt 51 which is stretched between rollers disposed apart in the left-and-right direction, and circulates in the counterclockwise direction of FIG. 1. The upper traveling surface of the conveying belt 51 forms a part of the conveyance path 7 passing through the image forming part 5. When the head unit 13 is lowered to the printing position, the nozzle region N of each recording head 31 of the four line heads 21 approaches the upper traveling surface of the conveying belt 51.

At the time of image forming operation, the head unit 13 is lowered to the printing position. The sheet S fed by the sheet feeding part 3 is conveyed to the image forming part 5 along the conveyance path 7. In the image forming part 5, the ink is ejected from the recording head 31 of each line head 21 based on image data on the sheet S conveyed by the conveying belt 51, and an image is thus formed on the sheet S.

Next, the maintenance unit 17 will be described with reference to FIG. 1. The maintenance unit 17 includes a cap unit 61 and a wipe unit 63.

The cap unit 61 is provided with a cap corresponding to each recording head 31 of each line head 21 of the head unit 13. The cap unit 61 is supported so as to be movable in the left-and-right direction between a retracting position on the left side of the head unit 13 and a capping position below the head unit 13 lifted to the retracting position. When the cap unit 61 is moved to the capping position and then the head unit 13 is lowered, each cap is pressed against the head base 33 to cover the nozzle region N of each recording head 31.

Figure 3:
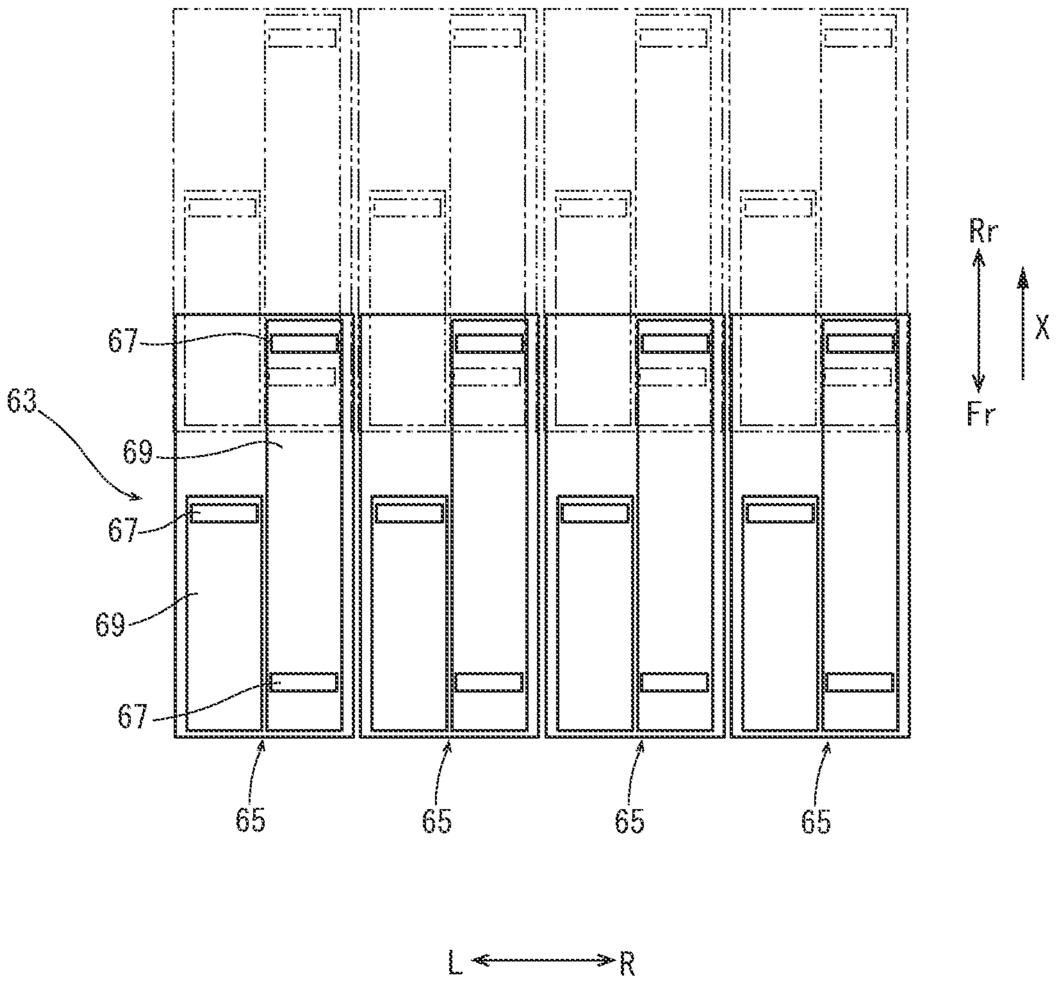
FIG. 3 is a plan view showing a wipe unit in the image forming apparatus according to the embodiment of the present disclosure.

The wipe unit 63 will be described with reference to FIG. 1 and FIG. 3. FIG. 3 is a plan view showing the wipe unit 63. The wipe unit 63 includes four wiper carriages 65 corresponding to the four line heads 21 of the head unit 13. The wiper carriage 65 is supported in a movable manner in the front-and-rear direction. The wiper carriage 65 is provided with three wipers 67 corresponding to the three recording heads 31 of the line head 21, and a tray 69 in which the ink wiped by each wiper 67 is collected. The wiper 67 may be a blade made of elastic material, or one formed by attaching a cloth around a blade or a roller made of elastic material. The wipe unit 63 is supported so as to be movable in the left-and-right direction between a retracing position on the left side of the head unit 13 and a wiping position below the head unit 13 lifted to the retracting position.

After the wipe unit 63 is moved to the wiping position, the head unit 13 is lowered to bring the wiper 67 into contact with the nozzle region N, and each wiper carriage 65 is moved from a front wiping start position (see the solid line in FIG. 3) to a rear wiping end position (see the dashed line in FIG. 3), so that the nozzle region N of each recording head 31 (see the dashed line in FIG. 2) of each line head 21 is wiped off by the wiper 67 of the wiper carriage 65. The wiped ink by the wiper 67 falls on the tray 69 and is collected through a collection port (not shown). The moving direction of the wiper carriage 65 is defined as a wiping direction X. In this embodiment, the wiping direction X is a direction from the front to the rear.

Figure 4A:
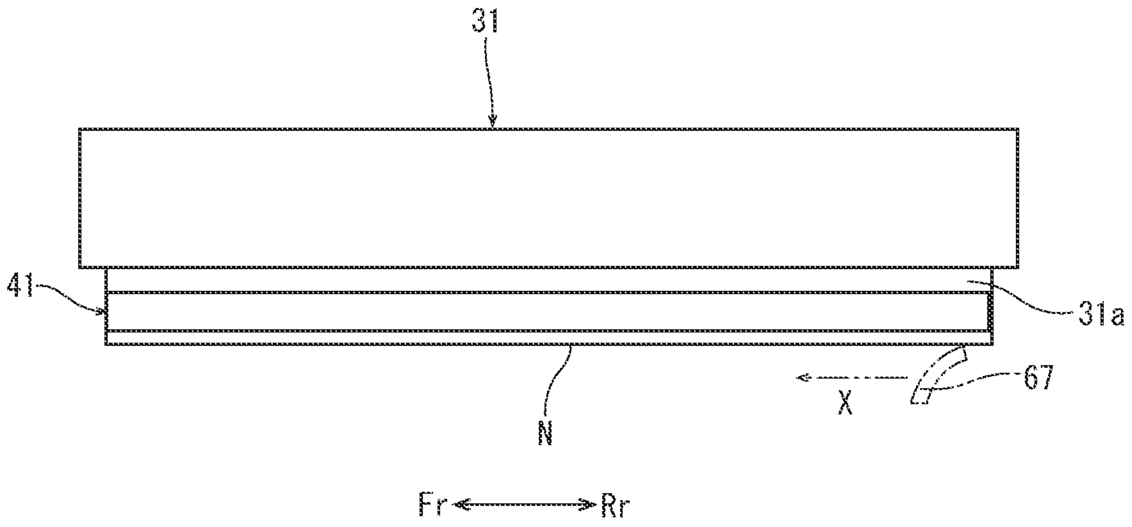
FIG. 4A is a side view showing a recording head in the image forming apparatus according to the embodiment of the present disclosure.

Next, the recording head 31 will be described with reference to FIG. 4A and FIG. 4B. FIG. 4A is a view showing the recording head 31 viewed from the left side, and FIG. 4B is a view showing the recording head 31 viewed from the front side.

A head mounting part 41 is formed on the side surfaces 31*a* of the nozzle region N of the recording head 31 along the front-and-rear direction, that is, the wiping direction X. The head mounting part 41 may be provided only on one side surface 31*a*, but preferably on both the side surfaces 31*a*. The head mounting part 41 is formed in a rectangular parallelepiped shape having a cross section long in the upper-and-lower direction when viewed in the front-and-rear direction, and is formed at a position higher than the nozzle region N. The fact that the head mounting part 41 is formed at a position higher than the nozzle region N means that the side surface 31*a* exists between the head mounting part 41 and the nozzle region N. A distance between the head mounting part 41 and the nozzle region N is preferably 0.03 to 2 mm, more preferably 0.05 to 1 mm, particularly 0.1 to 0.5 mm.

Figure 4B:
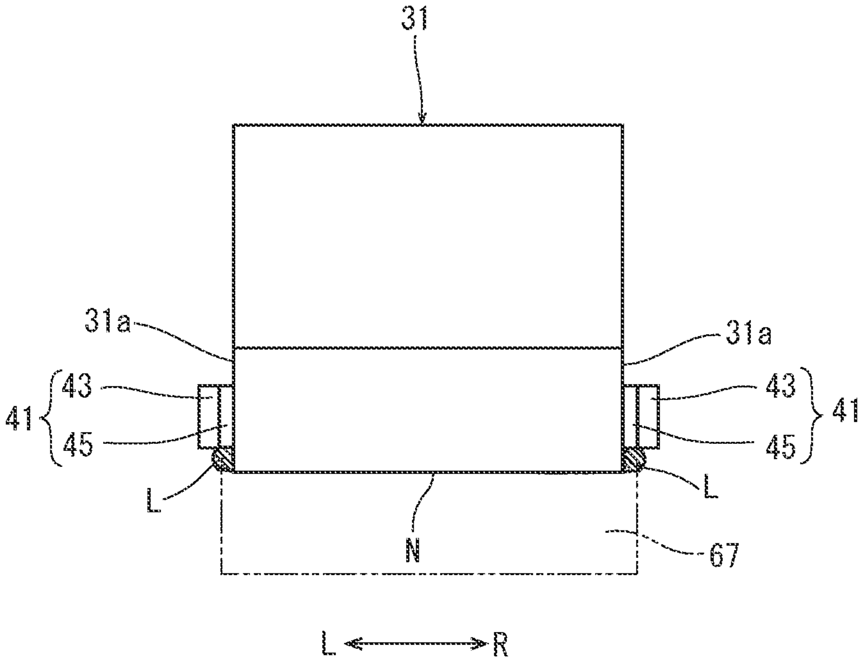
FIG. 4B is a front view showing the recording head in the image forming apparatus according to the embodiment of the present disclosure.

As shown in FIG. 4B, the head mounting part 41 includes an outside portion 43 and an inside portion 45 provided between the outside portion 43 and the side surface 31*a* of the recording head 31. The outside portion 43 is made of material (for example, silicon resin or fluorine resin) having a water repellency higher than that of the recording head 31. In other words, the contact angle of the ink with respect to the surface of the outside portion 43 is larger than the contact angle of the ink with respect to the side surface 31*a* of the recording head 31. Alternatively, only the surface of the outside portion 43 may be coated with material having a higher water repellency. As an example, the thickness of the outside portion 43 is 0.2 to 0.3 mm.

The inside portion 45 is made of material (for example, PET or acrylic double-sided tape) having a water repellency lower than that of the outside portion 43. In other words, the contact angle of the ink with respect to the surface of the outside portion 43 is larger than the contact angle of the ink with respect to the surface of the inside portion 45. Preferably, the inside portion 45 is made of material having a water repellency lower than that of the recording head 31. In other words, the contact angle of the ink with respect to the surface of the inside portion 45 is smaller than the contact angle of the ink with respect to the side surface 31*a* of the recording head 31. Further, the inside portion 45 is preferably made of material having a smaller contact angle with the ink. As an example, the thickness of the inside portion 45 is 0.1 mm.

The inside portion 45 is fixed to the side surface 31*a* of the recording head 31 without any gap by a method such as a double-sided tape, an adhesive, or a heat fusion method, and the outside portion 43 is fixed to the side surface of the inside portion 45 without any gap by a method such as a double-sided tape, an adhesive, or a heat fusion method.

A wiping operation in the image forming apparatus 1 having the above configuration will be described with reference to FIG. 4A and FIG. 4B. The wiping operation is performed, for example, after the ink in the nozzle of the recording head 31 is purged. At the time of wiping operation, as described above, the wiper carriage 65 (see FIG. 3) of the wipe unit 63 is moved in the wiping direction X, and the wiper 67 wipes the ink off the nozzle region N. Since the wiper 67 is pressed against the nozzle region N at a predetermined pressure, the wiper 67 is curved upstream in the wiping direction X as shown in FIG. 4A. Since the width of the wiper 67 is slightly wider than the width of the nozzle region N, both the end portions of the wiper 67 project upward from the nozzle region N as shown in FIG. 4B when pressed against the nozzle region N.

The ink L wiped by the wiper 67 is pushed upward (rise upward) from both the end portions of the wiper 67 to the side surfaces 31*a* of the recording head 31. The risen ink L presently reaches the head mounting part 41. Since the inside portion 45 of the head mounting part 41 has a water repellency smaller than that of the side surface 31*a* of the recording head 31, the ink L is fitted to the inside portion 45 and held in the corner between the side surface 31*a* of the recording head 31 and the inside portion 45. On the other hand, since the outside portion 43 has a water repellency larger than that of the side surface 31*a* of the recording head 31 and the inside portion 45, the ink L is easily repelled. As a result, the ink L is held at the corners of the side surfaces 31*a* of the recording head 31 and the lower surface of the inside portions 45 by intermolecular forces with both the surfaces.

As is clear from the above description, according to the present disclosure, the ink L risen upward around the side surface 31*a* of the recording head 31 at the time of wiping operation is held in the corner between the lower surface of the head mounting part 41 and the side surface 31*a* of the recording head 31. In particular, since the inside portion 45 of the head mounting part 41 has a water repellency lower than that of the side surface 31*a* of the recording head 31, the inside portion 45 is easy to be familiar with the ink L. That is, the inside portion 45 is easy to hold the ink L. On the other hand, since the outside portion 43 has a water repellency larger than that of the side surface 31*a* of the recording head 31 and the inside portion 45, the outside portion 43 easily repels the ink L. Therefore, even if the amount of the held ink L increases and then reaches below the outside portion 43, the amount of held ink L does not increase larger than a certain level because the outside portion 43 is difficult to hold the ink L. In this way, the ink L risen upward during the wiping operation can always be held by a fixed amount. Each time when the wiping operation is repeated, the ink L rises upward and is contained in the held ink L, but since the amount of the held ink L is limited to a certain level, the risen ink L and the held ink L are always replaced.

Further, as described above, since the ink is held by the intermolecular force between the side surface 31*a* of the recording head 31 and the lower surface of the inside portion 45, the held ink L is hardly fallen by its own weight. Thus, even when vibration is applied to the recording head 31 at the time of image forming operation, the held ink L is prevented from falling, and the image defects and the contaminating the inside of the apparatus can be prevented.

It is preferable that the thickness of the inside portion 45 is thinner because the amount of held ink L can be reduced. On the other hand, the thicker the outside portion 43 is, the stronger the force for repelling the ink L becomes, and the increase of the amount of held ink L can be more reliably prevented. In the present embodiment, by setting the thickness of the inside portion 45 to 0.03 to 0.5 mm, particularly 0.05 to 0.2 mm, it is possible to reduce the amount of held ink L while the force for holding the ink L kept. Further, by setting the thickness of the outside portion 43 to 0.2 to 0.3 mm, the amount of held ink L can be reduced while the force for holding the ink L kept.

The lower end surface of the head mounting part 41 is substantially parallel with the nozzle region N. The lower end surface is preferably within ±10° with respect to the nozzle region N and further substantially parallel with the nozzle region N in the wiping direction X. The lower end surface is preferably within ±30 degrees with respect to the nozzle region N, more preferably within ±15 degrees, particularly substantially parallel with the nozzle region N in a direction perpendicular to the wiping direction X. By doing so, the amount of held ink L can be reduced while the force for holding the ink L kept.

The lower end surface of the head mounting part 41 on the side of the side surface 31*a* serves as the inside portion 45. That is, a water repellency is different between the side surface 31*a* of the recording head 31 and the lower end surface of the head mounting part 41 at the apex of the surfaces. By doing so, the amount of held ink L can be reduced while the force for holding the ink L kept.

The head mounting part 41 may be a separate member separable from the recording head 31. Thus, the angle between the side surface 31*a* of the recording head 31 and the lower end surface of the head mounting part 41 becomes sharp, and a small amount of ink L is easily held.

Figure 5:
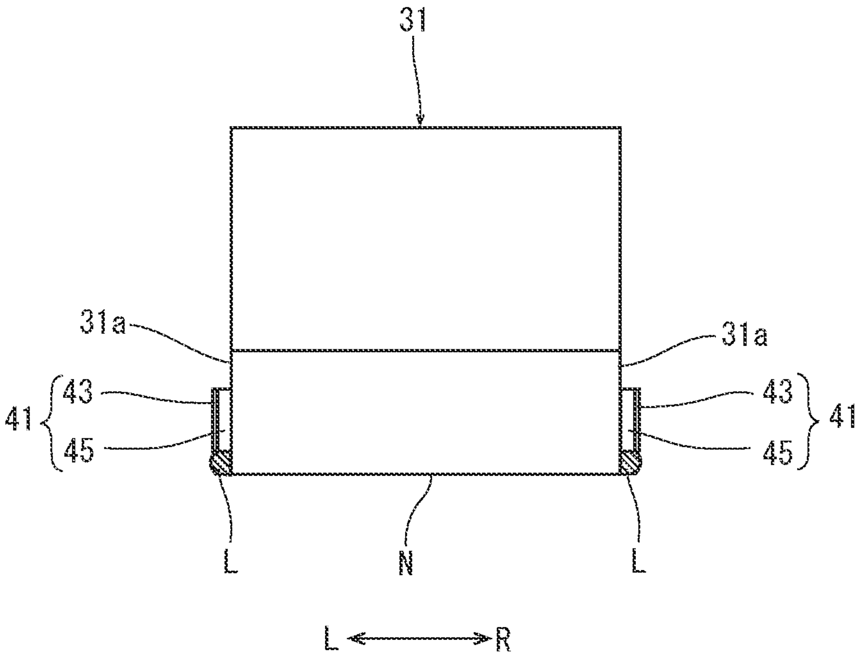
FIG. 5 is a front view showing a modified example of the recording head in the image forming apparatus according to the embodiment of the present disclosure.

Next, a modified example of the present disclosure will be described with reference to FIG. 5. FIG. 5 is a view showing the recording head 31 when viewed from the front side. The outside portion 43 of the head mounting part 41 may be formed by coating the outer surface of the inside portion 45 with water-repellent material (for example, fluorinated resins). In this modified example, a fixed amount of the ink L risen upward during the wiping operation can be held in the corners of the side surfaces 31*a* of the recording head 31 and the inside portions 45.

Although the present disclosure has been described with respect to specific embodiments, the present disclosure is not limited to the above embodiments. Those skilled in the art will be able to modify the above embodiments without departing from the scope and intent of the present disclosure.

The invention claimed is:

1. An image forming apparatus comprising:

a recording head provided with a nozzle region where a plurality of ink ejection ports are opened downward; and a wiper which comes into contact with the nozzle region and moves in a predetermined wiping direction to wipe the ink ejection ports, and a head mounting part protruding outward is provided along the wiping direction only on side surfaces of the recording head on both sides of the nozzle surface in a direction perpendicular to the wiping direction, at a position higher than the nozzle region, and the head mounting part has:

an outside portion having a water repellency higher than that of the side surface; and an inside portion provided inside the outside portion and having a water repellency smaller than that of the outside portion.

2. The image forming apparatus according to claim 1, wherein a lower surface of the head mounting part is parallel with the nozzle region.

3. The image forming apparatus according to claim 1, wherein a lower surface, on a side of the side surface, of the head mounting part serves as the inside portion.

4. The image forming apparatus according to claim 1, wherein a surface of the inside portion has a water repellency smaller than that of the side surface.

5. The image forming apparatus according to claim 1, wherein a lower surface of the head mounting part is parallel with a direction perpendicular to the wiping direction.

6. The image forming apparatus according to claim 1, wherein the inside portion has a thickness thinner than a thickness of the outside portion.

7. The image forming apparatus according to claim 1, wherein a gap is not formed between the side surface and the inside portion, and a gap is not formed between the inside portion and the outside portion.

* * * * *